United States Patent [19]

Hamanishi

[11] 4,260,223
[45] Apr. 7, 1981

[54] LENS SYSTEM FOR PHOTOGRAPHING OBJECTS FROM INFINITY TO A VERY SHORT DISTANCE

[75] Inventor: Yoshinari Hamanishi, Tokyo, Japan

[73] Assignee: Nippon Kogaku K.K., Tokyo, Japan

[21] Appl. No.: 67,141

[22] Filed: Aug. 16, 1979

[30] Foreign Application Priority Data

Aug. 21, 1978 [JP] Japan ................................. 53-100873

[51] Int. Cl.³ ........................... G02B 9/60; G02B 9/62
[52] U.S. Cl. ..................................... 350/465; 350/467
[58] Field of Search ........................ 350/214, 215, 218

[56]  References Cited
U.S. PATENT DOCUMENTS

| 3,815,974 | 6/1974 | Momiyama | 350/217 |
| 3,923,369 | 12/1975 | Nakamura | 350/214 |
| 3,975,090 | 8/1976 | Lawson | 350/214 |
| 4,029,397 | 6/1977 | Yamashita | 350/214 |

Primary Examiner—Conrad J. Clark
Attorney, Agent, or Firm—Shapiro and Shapiro

[57] ABSTRACT

A lens system for photographing objects from infinity to a very short distance has a forward group having a positive refractive power, a rearward group disposed rearwardly of the forward group and having a positive refractive power, and a diaphragm member provided between the two groups. The forward group is movable by a predetermined distance along the optic axis of the lens system in accordance with the object distance for focusing. The rearward group is movable by an amount smaller than the amount of movement of the forward group in the direction of the optic axis in accordance with the object distance for focusing.

10 Claims, 13 Drawing Figures

LENS SYSTEM FOR PHOTOGRAPHING OBJECTS FROM INFINITY TO A VERY SHORT DISTANCE

BACKGROUND OF THE INVENTION

1. Field of the Invention

This invention relates to a so-called short-distance photographing lens which can photograph objects from infinity to a very short distance.

2. Description of the Prior Art

Various types of short-distance photographing lenses called the microlenses or the macrolenses have heretofore been put into practice, but there have been no sufficient ones. These lenses are designed to provide the best performance for objects at a relatively short distance, but their image forming performance has unavoidably been deteriorated as the photographing magnification has become greater. It has, therefore, been necessary to mount an attachment lens exclusively for use for the correction of aberrations on a lens body in order to maintain an excellent image forming performance for short-distance objects for which the photographing magnification is one-to-one magnification. Also, the F-number of the conventional lenses has been on the order of 3.5 at best and they have been unsatisfactory as commonly used lenses in terms of the brightness.

SUMMARY OF THE INVENTION

It is an object of the present invention to provide a short-distance photographing lens having a great aperture and having an excellent image forming performance in a photographing range from infinity to objects at a very short distance.

The short-distance photographing lens of the present invention comprising a forward group having a positive refractive power, a rearward group also having a positive refractive power, and a diaphragm provided between the two groups, and is designed such that during the focusing of the lens for infinity object to a short-distance object, both groups are moved toward the object side while the air space between the two groups is increased.

By adopting the so-called spacing correction, the present invention has established a new technique of aberration correction in the short-distance photographing condition of a lens system comprising two positive groups. In the present invention, the air space between the two groups, namely, the so-called diaphragm space, becomes great during the short-distance photography and therefore, where the diaphragm is provided integrally with the rearward group, the entrance pupil is displaced far away from the object and the angle formed between it and the optic axis of the light flux entering the lens system becomes small, thus facilitating the aberration correction. Where the diaphragm is provided integrally with the forward group, the exit pupil goes away from the image and the angle of the light flux leaving the lens system becomes small, thus facilitating the aberration correction again in this case. Therefore, by suitably balancing the distribution of refractive power, namely, the distribution of apparent brightness, of each of the forward and rearward groups, it is possible to reduce the aggravation of the aberrations during short-distance photography without making the lens system complicated. As a lens system comprising two lens groups of positive refractive power with a diaphragm interposed therebetween, the Gaussian type lens is typical and where it is desired to make such type of lens system have a great aperture ratio and a sufficiently long back focus, the refractive power of the forward group tends to become remarkably weaker than the refractive power of the rearward group. Where the lens system is made to have a great aperture ratio, each lens becomes thick and the back focus becomes short. Therefore, in order to provide a sufficient back focus in the condition of photographing an infinity object, the refractive power of the forward group must be weakened. This means that the light flux leaving the object is not so much converged by the forward group, and as the object is at a shorter distance, the emergent light from the forward group becomes more divergent. This light flux is taken over by the rearward group and thus, increase of the refractive power and brightness of the rearward group is required, but it is very difficult to design the rearward group so that it can well correct the various aberrations. It is, therefore, necessary to enhance the refractive power of the forward group more than in a conventional lens of this type having a great aperture ratio, and to increase the duty of the forward group as much as possible. By doing so, the duty of the rearward group for aberration correction is alleviated in the shortest distance range, and even in the case of the short distance the light flux from the object can be used in its condition of becoming a converged light flux after leaving the forward group. However, too great a refractive power of the forward group makes the aberration correction in the forward group difficult and it is therefore desirable to limit the refractive power of the forward group to such an extent that the light flux from the object at the shortest distance becomes a slightly divergent light flux after leaving the forward group.

The invention will become fully apparent from the following detailed description thereof taken in conjunction with the accompanying drawings.

DESCRIPTION OF THE PREFERRED EMBODIMENTS

Figure 1A:
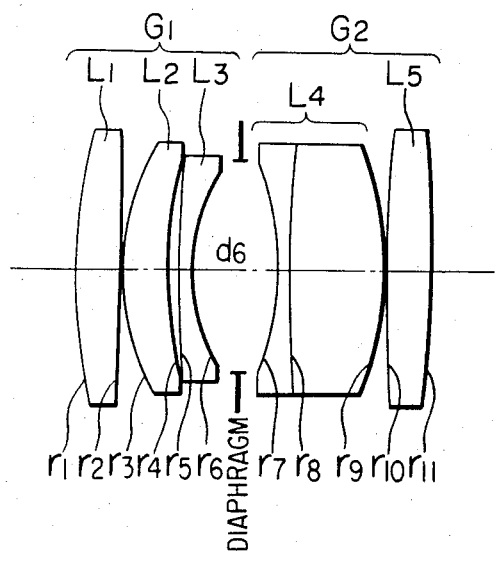
FIGS. 1A and 1B are cross-sectional views of a first embodiment of the present invention, FIG. 1A showing the condition during infinity object photographing and FIG. 1B showing the condition during shortest distance object photographing.

From the above-described characteristic of the lens system according to the present invention, it is desirable to satisfy the following conditions.

$$1.6 < f1/f < 2.4 \quad (1)$$

$$1.5 < f1/f2 < 2.5 \quad (2)$$

where f represents the total focal length of the entire system, and f1 and f2 represents the focal lengths of the forward and the rearward group, respectively.

The condition of formula (1) prescribes appropriate distribution of the refractive power for the forward group. If the lower limit of this condition is exceeded, the refractive power of the forward group will become too strong and it will be difficult to make the back focus sufficiently long in the infinity photographing condition and the variation in spherical aberration will become remarkable in the infinity object photographing condition and in the shortest distance object photographing condition. To correct this, the forward group must unavoidably be of a complicated construction. On the other hand, if the upper limit is exceeded, the duty of the refractive power for the rearward group will become relatively too strong and therefore, the spherical aberration in the shortest distance will occur so remarkably that it will be difficult to correct it. Enhancing the refractive power of the rearward group is effective to provide a great aperture ratio, as already noted, but it is disadvantageous for objects at the shortest distance and it is desirable to prescribe the refractive power of the rearward group in the above-indicated range as a lens system providing a high photographing magnification like that provided by the present invention.

The condition of formula (2) prescribes the ratio of the focal lengths, namely, the distribution of the refractive powers, of the forward and the rearward groups and with the condition of formula (1), this condition is for making the lens system bright and reducing the shortest distance and providing a high photographing magnification. Also, this condition, with the condition of formula (1), prescribes the spacing between the forward and the rearward groups. If the lower limit of the condition of formula (2) is exceeded, the refractive power of the forward group will become too strong and the amounts of various aberrations in the forward group will be increased. To correct this, the number of lenses forming the forward group may be increased to thicken the lens system, but since the principal point of the forward group which is adjacent to the image side comes into the interior of the lens, the lenses of the two groups interfere with each other during the photographing of an infinity object when the forward and the rearward groups come closest together and it becomes difficult to provide a sufficient diaphragm space. If the upper limit of formula (2) is exceeded, good aberration correction will be possible in the infinity photographing condition even if considerably high brightness is provided, but in the shortest distance photographing condition, various aberrations will occur so remarkably that no good correction can be maintained.

In the construction comprising a forward group and a rearward group as described above, the so-called modified Gaussian type lens system is specifically adopted as the basic construction. That is, as shown in FIG. 1 which shows a cross-sectional view of the optical system according to a first embodiment, the forward group G1 comprises, in order from the object side, a first positive lens L1 having its surface of sharper curvature facing the object side, a positive meniscus lens L2 having its convex surface facing the object side, and a negative meniscus lens L3 having its convex surface also facing the object side, and the rearward group G2 comprises a meniscus lens L4 consisting of a negative lens and a positive lens cemented together and having its concave surface facing the object side, and a second positive lens L5. In the conventional system wherein photographing of the shortest distance object is effected without changing the diaphragm spacing in such a lens construction, the spherical aberration is over-corrected and the astigmatism was great and the curvature of field was remarkable while, at the same time, excessive coma occurred, but by varying the diaphragm spacing according to the present invention, these aggravating aberrations can be corrected very well. Also, such a construction satisfies the condition of achromatism in the forward group G1 and the rearward group G2, and therefore, suffers little deterioration of the image resulting from the chromatic aberration even if each group is greatly moved with the diaphragm spacing varied. Thus, by a relatively simple construction, it is possible to correct the various aberrations sufficiently well even for objects at a very short distance. Here, if the average refractive index N1 of each lens forming the forward group is $$1.68 < N1 < 1.78 \quad (3)$$

and if r1 and r2 represent the curvature radii of the object side surface and the image side surface of the first positive lens L1 located nearest to the object, it is desirable that the following relation be established:

$$0.7 < (r2+r1)/(r2-r1) < 0.97 \quad (4)$$

If the refractive index of the forward group becomes smaller than the lower limit of the condition of formula (3), the curvature of each lens surface will become sharper to bear the refractive power as the forward group determined by formulas (1) and (2) and various aberrations, especially, a high order of spherical aberration, will occur remarkably to make the correction at the shortest distance difficult. On the other hand, if the upper limit of this condition is exceeded, the refractive index of the negative lens will tend to become high to effect achromatization in the forward group and the Petzval sum will become excessive in the positive direction to thereby bring about an increased curvature of field. Also, the condition of formula (4) is for well correcting the high order of spherical aberration in the shortest distance, as well as for correcting the negative distortion which occurs remarkably in the shortest distance if the aperture ratio of the lens system is increased. In the present lens system of the above-described construction, it is possible to minimize the astigmatism and to maintain the planarity of the image plane by increasing the diaphragm spacing with respect to the object at a shorter distance, whereas the negative distortion tends to be remarkable. It is, therefore, desirable to permit the positive distortion to a certain extent for an infinity object and the shape of the first positive lens L1 having the greatest function in correction of distortion has been determined by the so-called shape factor as shown by formula (4). If the lower limit of this condition is exceeded, a great deal of coma will occur and, if the upper limit of the condition is exceeded, the negative distortion will be increased so that it will become difficult to well correct the negative distortion by other components.

Embodiments of the lens system for short distance photography according to the present invention will hereinafter be described.

Figure 1B:
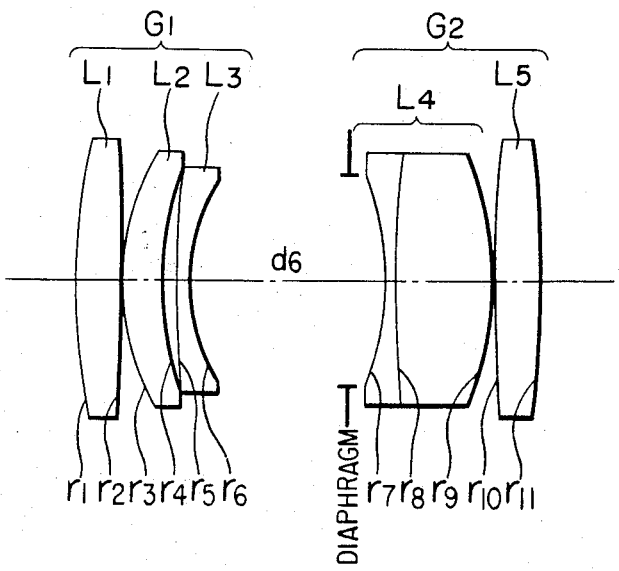
Figure 2A:
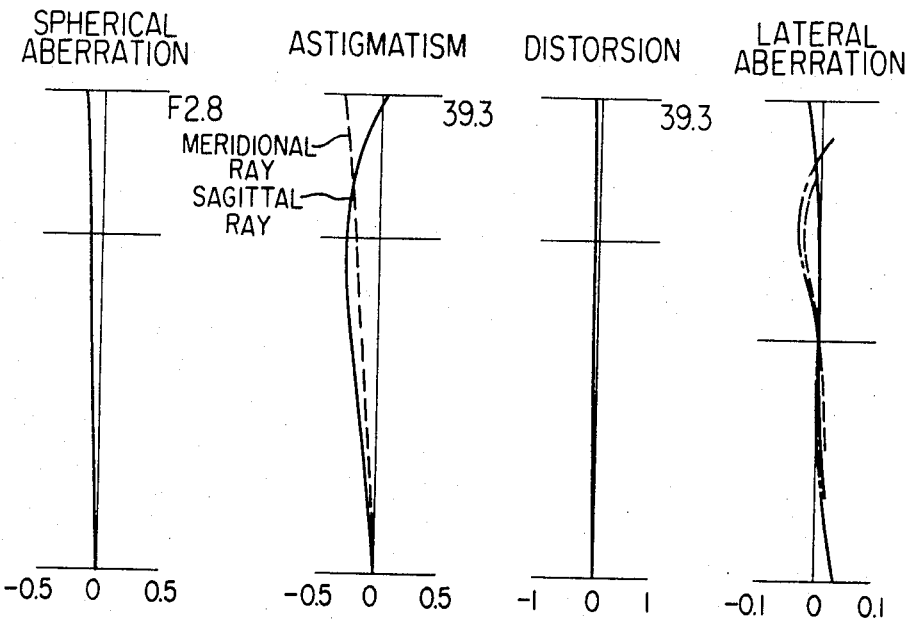
FIGS. 2A, 2B and 2C illustrate the various aberrations in the lens system of FIG. 1, FIG. 2A showing the aberrations when the object distance $d0=\infty$, FIG. 2B showing the aberrations when the object distance $d0=164.194$ and the photographing magnification $\beta=-1.0$, and FIG. 2C showing the aberrations when $d0=\infty$ and $\beta=-1.0$.
Figure 2B:
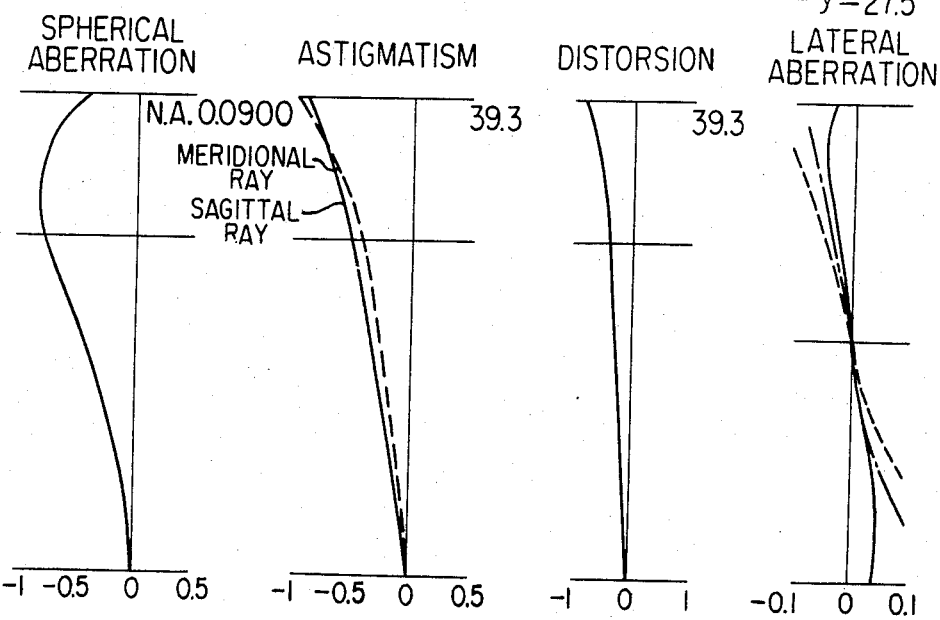
Figure 2C:
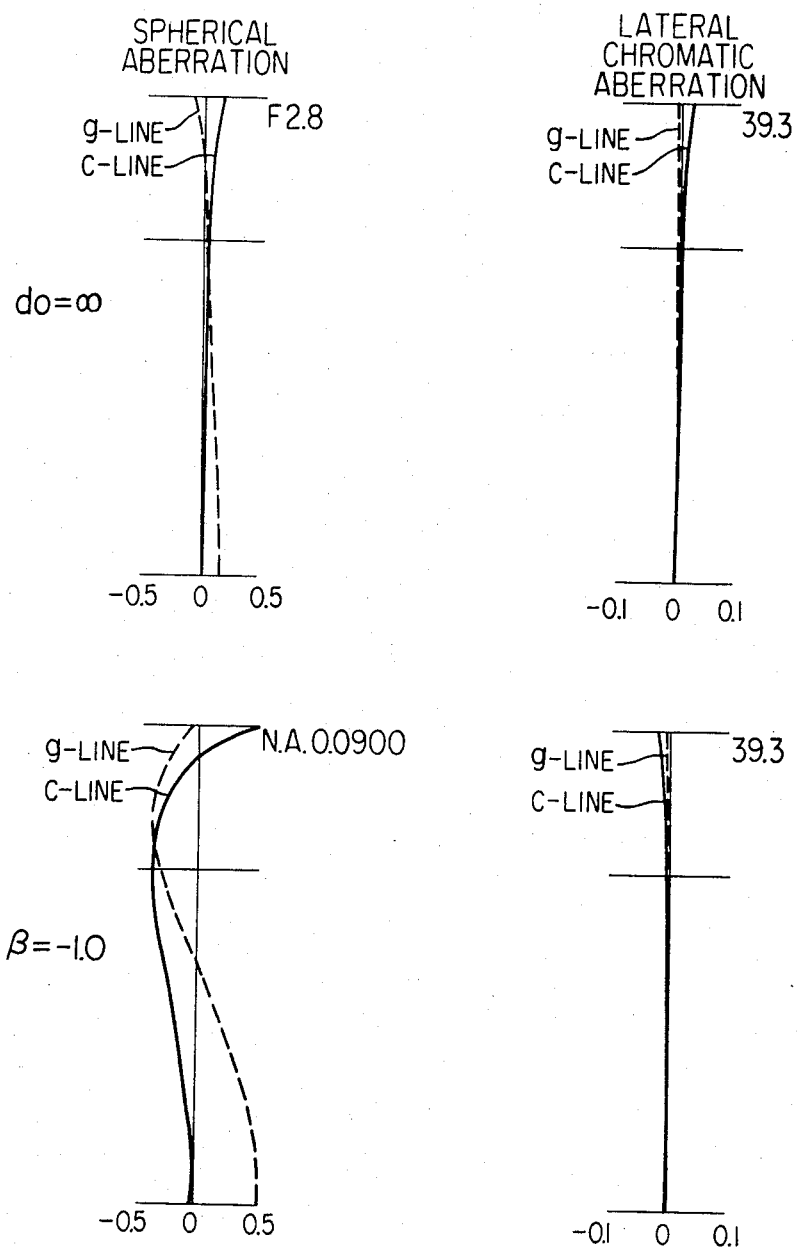

The first embodiment shown in FIG. 1 adopts the so-called modified Gaussian type and is constructed so as to satisfy all of the above-described four conditions. FIG. 1A shows the condition of the present embodiment during infinity object photography, and FIG. 1B shows the condition of the present embodiment during shortest distance object photography. This embodiment is constructed such that the diaphragm is movable with the rearward group. The numerical data of this embodiment are shown in Table 1 and the various aberrations are illustrated in FIG. 2. FIG. 2A shows the various aberrations when the object distance (the distance from the foremost lens surface of the lens system to the object) $d0 = \infty$, and FIG. 2B shows the various aberrations when the object distance $d0 = 164.194$ and the photographing magnification $\beta = -1.0$. The ordinate of spherical aberration at shortest distance object photography ($\beta = -1.0$) is shown hereinafter by numerical aperture (N.A.) instead of F-number. FIG. 2C shows spherochromatism and the lateral chromatic aberration when $d0 = \infty$ i.e. $\beta = -1.0$. It is seen that although the present embodiment is a bright lens system having F-number of 2.8, the chromatic aberration and the other aberrations are maintained in very well corrected conditions even in one-to-one magnification.

TABLE 1

(1st Embodiment)

Focal length f = 100.0   F-number 2.8
Angle of view 2ω = 42.92°

| | | | |
|---|---|---|---|
| | r1 = 93.082 | d1 = 6.818 | n1 = 1.77279 ν1 = 49.4 |
| | r2 = −1091.818 | d2 = 0.182 | |
| | r3 = 34.545 | d3 = 6.818 | n2 = 1.71300 ν2 = 53.9 |
| G1 | r4 = 57.109 | d4 = 1.909 | |
| | r5 = 163.636 | d5 = 1.909 | n3 = 1.61293 ν3 = 36.9 |
| | r6 = 29.252 | | |
| | | d6 = variable | |
| | r7 = −40.555 | d7 = 1.909 | n4 = 1.69895 ν4 = 30.0 |
| | r8 = 545.455 | d8 = 14.636 | n5 = 1.74443 ν5 = 49.4 |
| G2 | r9 = −45.455 | d9 = 0.182 | |
| | r10 = 345.538 | d10 = 6.818 | n6 = 1.79668 ν6 = 45.4 |
| | r11 = −225.162 | | | d6 = 13.301 when the object distance d0 = ∞.
d6 = 29.773 when the object distance d0 = 164.194,
i.e. the photographing magnification $\beta = -1.0$.
The diaphragm lies 5.818 ahead of the foremost lens surface of the rearward group G2.

f1 = 208.824 f2 = 115.797

Figure 3A:
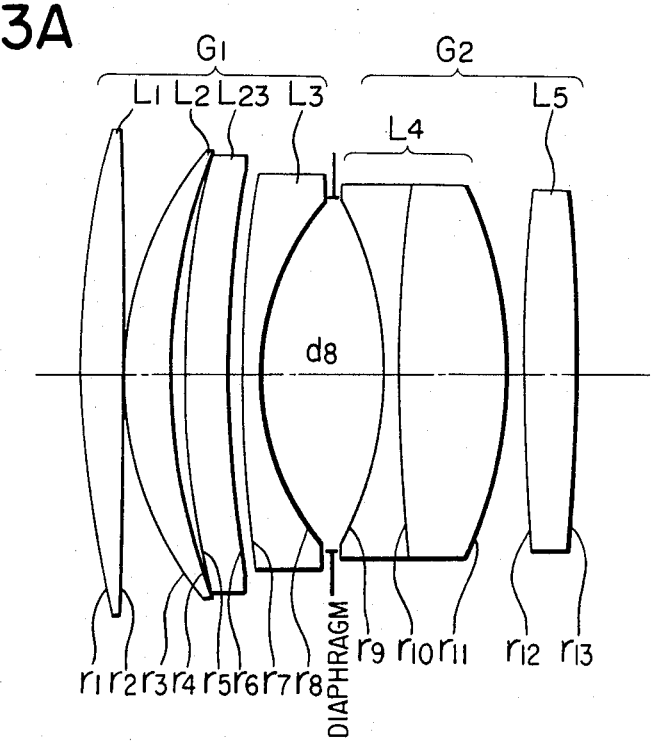
FIGS. 3A and 3B are cross-sectional views of the optical system according to a second embodiment of the present invention, FIG. 3A showing the condition when $d0=\infty$ and FIG. 3B showing the condition when $d0=209.438$ and $\beta=-0.7143$.
Figure 3B:
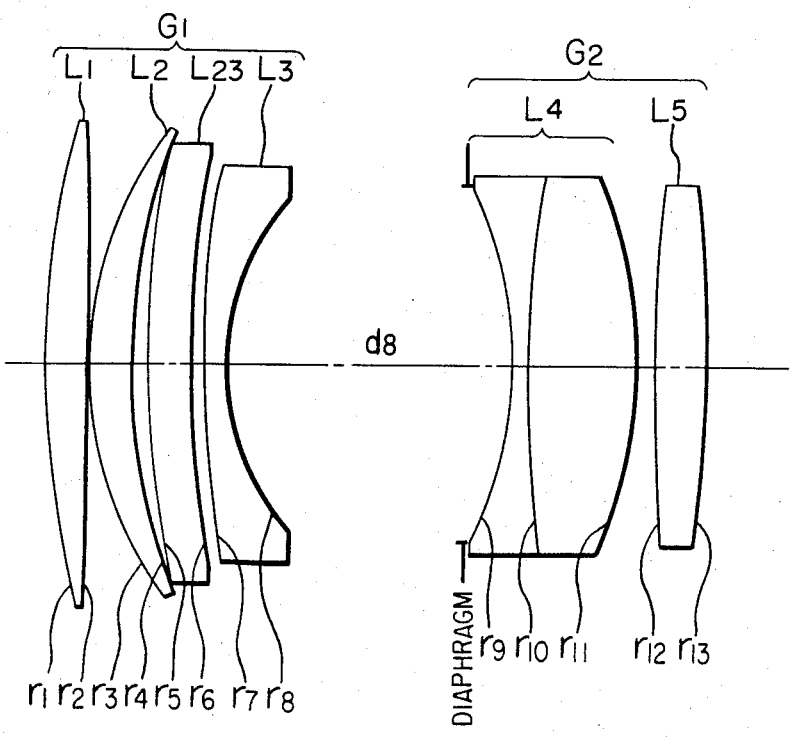
Figure 4A:
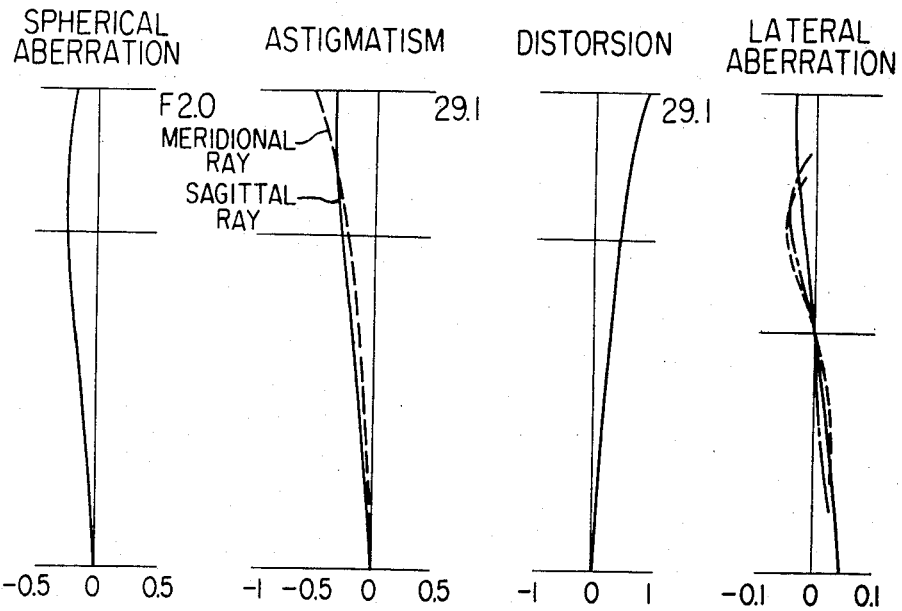
FIGS. 4A and 4B illustrate the various aberrations in the optical system of FIG. 3, FIG. 4A showing the aberrations when $d0=\infty$ and FIG. 4B showing the aberrations when $d0=209.438$ and $\beta=-0.7143$.
Figure 4B:
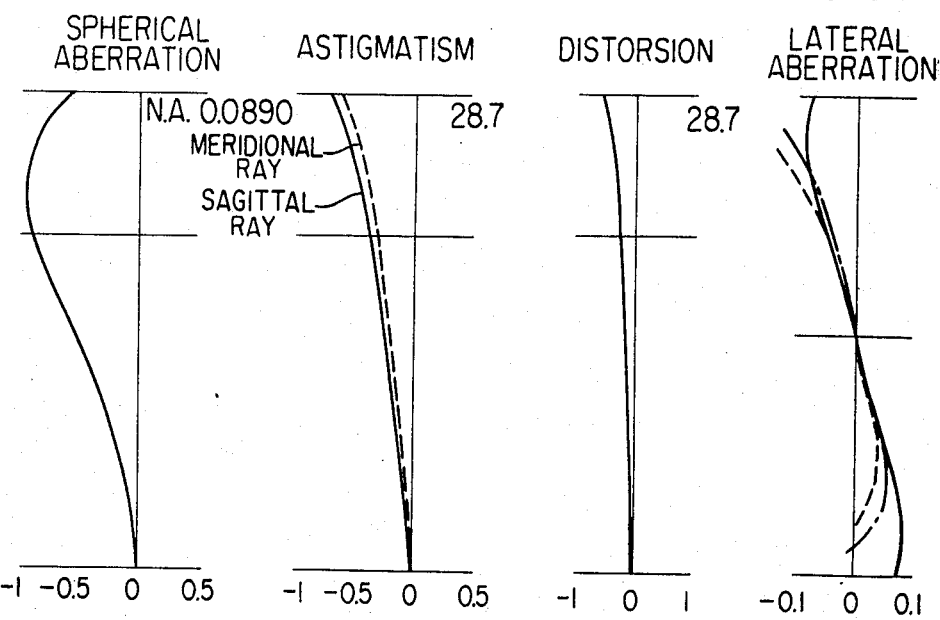

In a second embodiment, as shown in FIGS. 3A and 3B, a positive meniscus lens L23 having a relatively weak refractive power and having its convex surface facing the object side is provided between the positive meniscus lens L2 and the negative meniscus lens L3 of the forward group in the construction of the first embodiment to provide a better correction of aberration in the forward group. FIG. 3A shows the condition when $d0 = \infty$ and FIG. 3B shows the condition when $d0 = 209.438$ i.e. $\beta = -0.7143$. The numerical data of this embodiment are shown in Table 2, and the various aberrations when $d0 = \infty$ and $d0 = 209.438$ i.e. $\beta = -0.7143$ are shown in FIGS. 4A and 4B, respectively. It is seen that although this embodiment has as great an aperture ratio as F-number 2.0, the various aberrations are well corrected even in the shortest distance.

TABLE 2

(2nd Embodiment)

Focal length f = 100.0   F-number 2.0
Angle of view 2ω = 32.13°

| | | | |
|---|---|---|---|
| | r1 = 84.959 | d1 = 4.667 | n1 = 1.64006 ν1 = 60.0 |
| | r2 = −1325.784 | d2 = 0.133 | |
| | r3 = 36.591 | d3 = 6.000 | n2 = 1.73200 ν2 = 53.7 |
| | r4 = 75.228 | d4 = 1.333 | |
| G1 | r5 = 99.468 | d5 = 4.667 | n3 = 1.77279 ν3 = 49.4 |
| | r6 = 130.339 | d6 = 1.733 | |
| | r7 = 186.171 | d7 = 2.000 | n4 = 1.74950 ν4 = 34.96 |
| | r8 = 28.492 | | |
| | | d8 = variable | |
| | r9 = −38.353 | d9 = 2.000 | n5 = 1.66096 ν5 = 32.8 |
| | r10 = 213.825 | d10 = 12.133 | n6 = 1.77511 ν6 = 43.4 |
| G2 | r11 = −46.259 | d11 = 2.000 | |
| | r12 = 309.113 | d12 = 5.733 | n7 = 1.71300 ν7 = 53.9 |
| | r13 = −182.440 | | | d8 = 13.710 when the object distance d0 = ∞.
d8 = 32.377 when the object distance d0 = 209.438,
i.e. the photographing magnification $\beta = -0.7143$.
The diaphragm lies 5.333 ahead of the foremost lens surface of the rearward group G1.

f1 = 204.000 f2 = 107.692

Figure 5A:
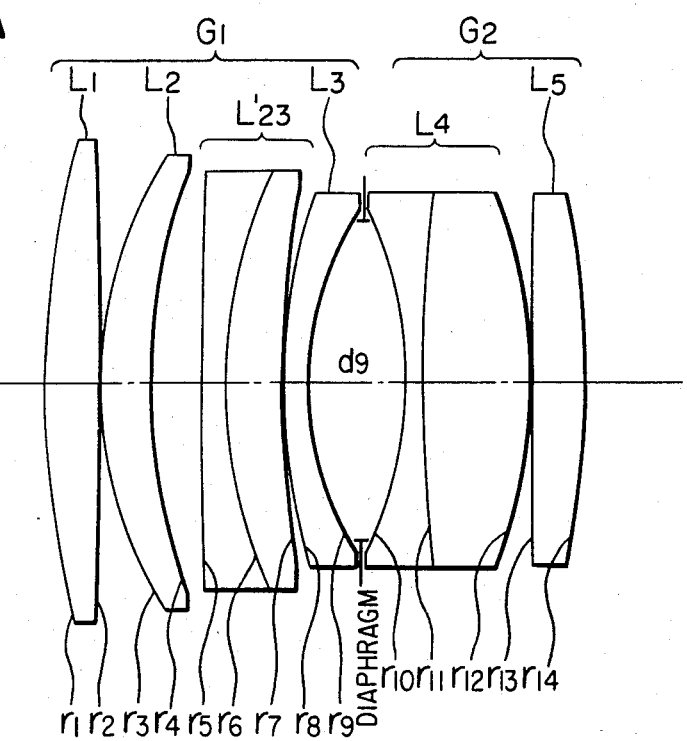
FIGS. 5A and 5B are cross-sectional views of a third embodiment of the present invention, FIG. 5A showing the condition when $d0=\infty$ and FIG. 5B showing the condition when $d0=205.696$ and $\beta=-0.7143$.
Figure 5B:
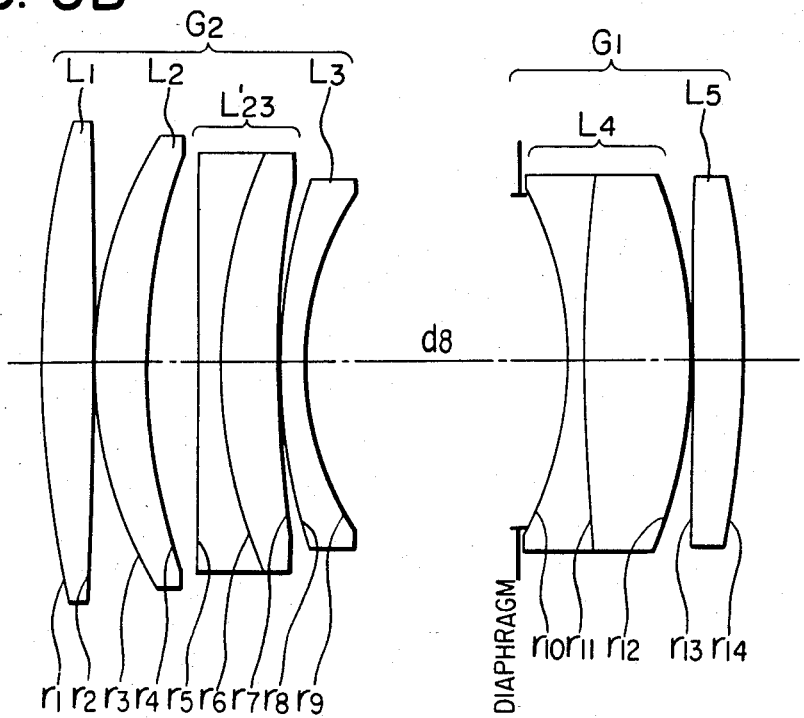

In a third embodiment, as shown in FIGS. 5A and 5B, a negative lens L23' comprising a negative lens and a positive lens cemented together is provided instead of the positive meniscus lens L23 in the construction of the above-described second embodiment to provide better achromatization in the forward group and enhance the correction capability for the other aberrations. As in the second embodiment, it has become possible to provide a lens system of F-number 2.0. FIG. 5A shows the condition when $d0 = \infty$ and FIG. 5B shows the condition when $d0 = 205.696$ i.e. $\beta = -0.7143$.

Figure 6A:
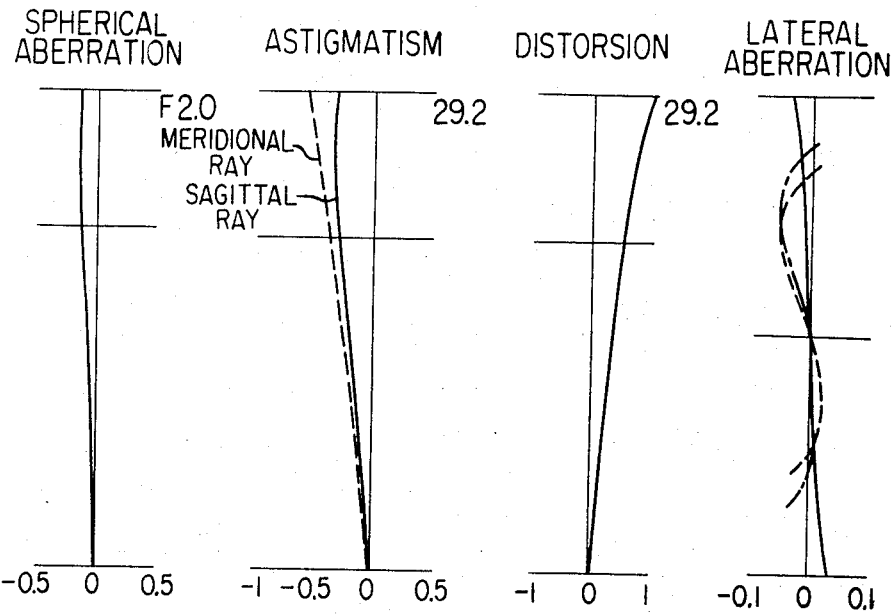
FIGS. 6A and 6B illustrate the various aberrations in the system of FIG. 5, FIG. 6A showing the aberrations when $d_0 = \infty$ and FIG. 6B showing the aberrations when $d_0 = 205.696$ and $\beta = -0.7143$.
Figure 6B:
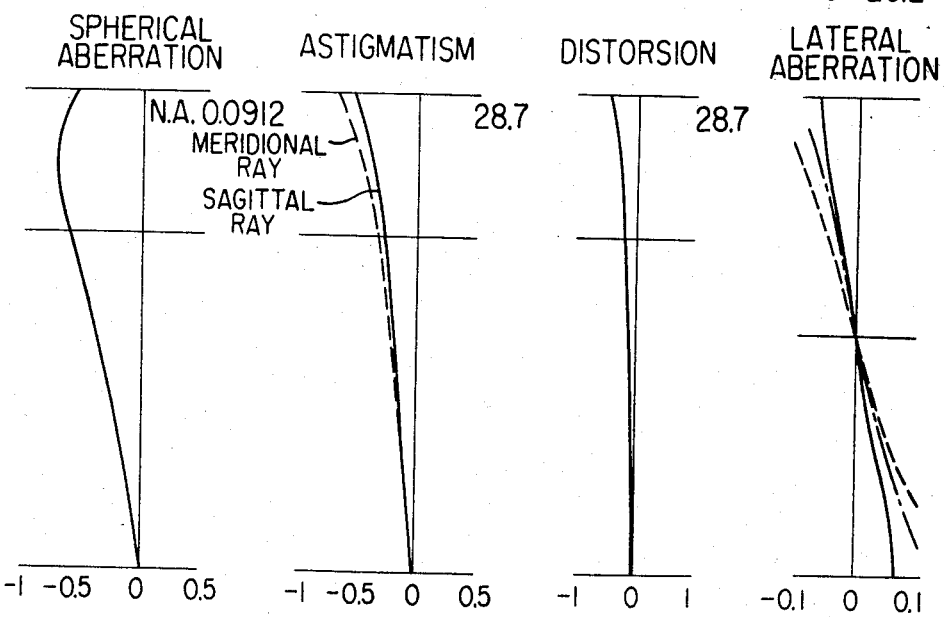

The numerical data of this embodiment is shown in Table 3, and the various aberrations when $d0 = \infty$ and $\beta = -0.7143$ are shown in FIGS. 6A and 6B, respectively.

TABLE 3

(3rd Embodiment)

Focal length f = 100.0   F-number 2.0
Angle of view 2ω = 32.130

| | | | |
|---|---|---|---|
| | r1 = 108.589 | d1 = 6.000 | n1 = 1.77279 ν1 = 49.4 |
| | r2 = −1622.547 | d2 = 0.133 | |
| | r3 = 49.292 | d3 = 6.000 | n2 = 1.77279 ν2 = 49.4 |
| | r4 = 75.600 | d4 = 5.333 | |
| G1 | r5 = 998.957 | d5 = 2.667 | n3 = 1.69895 ν3 = 30.0 |
| | r6 = 51.669 | d6 = 6.667 | n4 = 1.79631 ν4 = 40.92 |
| | r7 = 163.969 | d7 = 0.133 | |
| | r8 = 79.592 | d8 = 2.667 | n5 = 1.59507 ν5 = 35.6 |
| | r9 = 33.079 | | |
| | | d9 = variable | |
| | r10 = −37.087 | d10 = 2.000 | n6 = 1.64831 ν6 = 33.8 |
| | r11 = 247.596 | d11 = 12.133 | n7 = 1.80411 ν7 = 46.6 |
| G2 | r12 = −50.893 | d12 = 0.133 | |
| | r13 = −1276.096 | d13 = 5.733 | n8 = 1.80411 ν8 = 46.6 |
| | r14 = −102.211 | | | d9 = 11.086 when the object distance d0 = ∞.
d9 = 29.753 when the object distance d0 = 205.696,
i.e. the photographing magnification $\beta = -0.7143$.
The diaphragm lies 5.333 ahead of the foremost lens surface of the forward group G1.

f1 = 204.000

TABLE 3-continued (3rd Embodiment)

f2 = 107.692

According to the present invention, as has been described above, there is achieved a lens system which has no auxiliary lens added thereto and which is simple in construction and yet has a great aperture ratio and maintains good correcting conditions of aberrations even during the photographing of objects at a very short distance.

I claim:

1. A lens system for photographing objects from infinity to a very short distance, comprising:
    a forward group having a positive refractive power, said forward group being movable by a predetermined distance in the direction of the optic axis of the lens system in accordance with the object distance for focusing;
    a rearward group having a positive refractive power and disposed rearwardly of said forward group, said rearward group being movable by an amount smaller than the amount of movement of said forward group in the direction of the optic axis in accordance with the object distance for focusing; and
    a diaphragm member provided between said forward group and said rearward group;
    whereby during the focusing with respect to from the infinity object to the short distance object, the relative spacing between said two groups is increased in accordance with the object distance to thereby permit the photographing of up to a very short distance object to be well effected.

2. The lens system according to claim 1, wherein said diaphragm member is movable with said rearward group.

3. The lens system according to claim 2, wherein the following relations are satisfied:

$$1.6 < f1/f < 2.4$$

$$1.5 < f1/f2 < 2.5$$

where f represents the total focal length of the entire system, and f1 and f2 represent the focal lengths of said forward group and said rearward group, respectively.

4. The lens system according to claim 3, wherein said forward group comprises, in order from the object side, a first positive lens component having its surface of sharper curvature facing the object side, a positive meniscus lens component having its convex surface facing the object side, and a negative meniscus lens component having its convex surface also facing the object side, and said rearward group comprises, in order from the object side, a meniscus lens component consisting of a negative lens and a positive lens cemented together and having its concave surface facing the object side, and a second positive lens component.

5. The lens system according to claim 4, wherein said forward group further has a meniscus lens provided between said positive meniscus lens and said negative meniscus lens and having its convex surface facing the object side.

6. The lens system according to claim 5, wherein said meniscus lens provided between said positive meniscus lens and said negative meniscus lens of said forward group has a convex cemented surface facing the object side.

7. The lens system according to claims 4, 5 or 6, wherein the following conditions are satisfied:

$$1.68 < N1 < 1.78$$

$$0.7 < (r2 + r1)/(r2 - r1) < 0.97$$

where N1 represents the average refractive index of each lens in said forward group, and r1 and r2 represent the curvature radii of the object side surface and the image side surface, respectively, of said first positive lens in said forward group.

8. The lens system according to claim 4, wherein the numerical data are as follows:

Focal length f = 100.0     F-number 2.8
Angle of view 2ω = 42.92°

| | | | |
|---|---|---|---|
| | r1 = 93.082 | d1 = 6.818 | n1 = 1.77279 ν1 = 49.4 |
| | r2 = −1091.818 | d2 = 0.182 | |
| | r3 = 34.545 | d3 = 6.818 | n2 = 1.71300 ν2 = 53.9 |
| G1 | r4 = 57.109 | d4 = 1.909 | |
| | r5 = 163.636 | d5 = 1.909 | n3 = 1.61293 ν3 = 36.9 |
| | r6 = 29.252 | | |
| | | d6 = variable | |
| | r7 = −40.555 | d7 = 1.909 | n4 = 1.69895 ν4 = 30.0 |
| | r8 = 545.455 | d8 = 14.636 | n5 = 1.74443 ν5 = 49.4 |
| G2 | r9 = −45.455 | d9 = 0.182 | |
| | r10 = 345.538 | d10 = 6.818 | n6 = 1.79668 ν6 = 45.4 |
| | r11 = −225.162 | | | d6 = 13.301 when the object distance d0 = ∞.
d6 = 29.773 when the object distance d0 = 164.194,
i.e. the photographing magnification β = −1.0.
The diaphragm lies 5.818 ahead of the foremost lens surface of the rearward group G2.

f1 = 208.824
f2 = 115.777

9. The lens system according to claim 5, wherein the numerical data are as follows:

Focal length f = 100.0     F-number 2.0
Angle of view 2ω = 32.13°

| | | | |
|---|---|---|---|
| | r1 = 84.959 | d1 = 4.667 | n1 = 1.64006 ν1 = 60.0 |
| | r2 = −1325.784 | d2 = 0.133 | |
| | r3 = 36.591 | d3 = 6.000 | n2 = 1.73200 ν2 = 53.7 |
| | r4 = 75.228 | d4 = 1.333 | |
| G1 | r5 = 99.468 | d5 = 4.667 | n3 = 1.77279 ν3 = 49.4 |
| | r6 = 130.339 | d6 = 1.733 | |
| | r7 = 186.171 | d7 = 2.000 | n4 = 1.74950 ν4 = 34.96 |
| | r8 = 28.492 | | |
| | | d8 = variable | |
| | r9 = −38.353 | d9 = 2.000 | n5 = 1.66096 ν5 = 32.8 |
| | r10 = 213.825 | d10 = 12.133 | n6 = 1.77511 ν6 = 43.4 |
| G2 | r11 = −46.259 | d11 = 2.000 | |
| | r12 = 309.113 | d12 = 5.733 | n7 = 1.71300 ν7 = 53.9 |
| | r13 = −182.440 | | | d8 = 13.710 when the object distance d0 = ∞.
d8 = 32.377 when the object distance d0 = 209.438,
i.e. the photographing magnification β = −0.7143.
The diaphragm lies 5.333 ahead of the foremost lens surface of the rearward group G1.

f1 = 204.000
f2 = 107.692

10. The lens system according to claim 6, wherein the numerical data are as follows:

Focal length f = 100.0     F-number 2.0
Angle of view 2ω = 32.13°

| | | |
|---|---|---|
| r1 = 108.589 | d1 = 6.000 | n1 = 1.77279 ν1 = 49.4 |
| r2 = −1622.547 | d2 = 0.133 | |

-continued $$G1\begin{cases} r3 = 49.292 & d3 = 6.000 & n2 = 1.77279 & \nu2 = 49.4 \\ r4 = 75.600 & d4 = 5.333 \\ r5 = 998.957 & d5 = 2.667 & n3 = 1.69895 & \nu3 = 30.0 \\ r6 = 51.669 & d6 = 6.667 & n4 = 1.79631 & \nu4 = 40.92 \\ r7 = 163.969 & d7 = 0.133 \\ r8 = 79.592 & d8 = 2.667 & n5 = 1.59507 & \nu5 = 35.6 \\ r9 = 33.079 \end{cases}$$

d9 = variable
r10 = −37.087  d10 = 2.000   n6 = 1.64831  ν6 = 33.8
r11 = 247.596  d11 = 12.133  n7 = 1.80411  ν7 = 46.6

-continued $$G2\begin{cases} r12 = -50.893 & d12 = 0.133 \\ r13 = -1276.096 & d13 = 5.733 & n8 = 1.80411 & \nu8 = 46.6 \\ r14 = -102.211 \end{cases}$$

d9 = 11.086 when the object distance d0 = ∞.
d9 = 29.753 when the object distance d0 = 205.696,
i.e. the photographing magnification β = −0.7143.
The diaphragm lies 5.333 ahead of the foremost lens surface of the forward group G1.

$$\begin{cases} f1 = 204.000 \\ f2 = 107.692 \end{cases}$$

* * * * *